(12) United States Patent
Asok et al.

(10) Patent No.: US 12,340,184 B2
(45) Date of Patent: Jun. 24, 2025

(54) INTELLIGENT TABLE SUGGESTION AND CONVERSION FOR TEXT

(71) Applicant: Microsoft Technology Licensing, LLC, Redmond, WA (US)

(72) Inventors: Abhijith Asok, Bellevue, WA (US); Courtney Sarah Cochrane, Cambridge, MA (US); Jenna Hong, Acton, MA (US); Yang He, Newton, MA (US); Lucas Anton Rosenblatt, Brooklyn, NY (US); Aleksandr Polyakov, Berkeley, CA (US); Natalie Ann Mionis, Cambridge, MA (US); Amit Dinesh Gupte, Bellevue, WA (US); Anish Yatin Pimpley, Bellevue, WA (US); Sean Gormley T. Kelley, Boston, MA (US); Yiquan Xu, Watertown, MA (US); Ransom Lloyd Richardson, Acton, MA (US); Michael Adam Scarpati, Wellesley, MA (US); Benjamin Gustav Wilde, Quincy, MA (US); Jichen Yang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 638 days.

(21) Appl. No.: 17/524,646

(22) Filed: Nov. 11, 2021

(65) Prior Publication Data

US 2023/0143568 A1    May 11, 2023

(51) Int. Cl.
G06F 17/00   (2019.01)
G06F 40/103   (2020.01)
(Continued)

(52) U.S. Cl.
CPC ............ *G06F 40/58* (2020.01); *G06F 40/103* (2020.01); *G06N 20/00* (2019.01)

(58) Field of Classification Search
CPC ........ G06F 40/10; G06F 40/58; G06F 40/103; G06F 40/00; G06F 40/12; G06F 40/131;
(Continued)

(56) References Cited

U.S. PATENT DOCUMENTS 6,714,939 B2    3/2004 Saldanha et al.
6,757,870 B1 *  6/2004 Stinger ................. G06F 40/143
                                                            715/234

(Continued)

OTHER PUBLICATIONS

Li, et al., "Table Detection from Plain Text Using Machine Learning and Document Structure", In Proceedings of Asia-Pacific Web Conference, Jan. 16, 2006, pp. 818-823.
(Continued)

*Primary Examiner* — Michael Ortiz-Sanchez
(74) *Attorney, Agent, or Firm* — Barta Jones, PLLC

(57) ABSTRACT

The disclosed technology is generally directed to the conversion of text to tables. In one example of the technology, input text that includes at least three rows is received. A plurality of characteristics of the input text is determined. Each characteristic of the plurality of characteristics is associated with a uniformity between the rows of the input text. The plurality of characteristics includes at least one characteristic that is associated with a delimiter count. A determination is made as to whether the input text is suitable for conversion to table based on the plurality of characteristics. Upon determining that the input text is suitable for conversion to a table, a machine learning model is used to convert the input text into a table.

20 Claims, 7 Drawing Sheets

(51) Int. Cl.
*G06F 40/58* (2020.01)
*G06N 20/00* (2019.01)

(58) Field of Classification Search
CPC ........ G06F 40/151; G06F 16/00; G06F 16/22; G06F 16/221; G06F 16/2228; G06F 16/20; G06F 16/258; G06F 16/93; G06F 40/174; G06F 2201/81; G06F 40/20; G06F 40/177; G06N 20/00
See application file for complete search history.

(56) References Cited

U.S. PATENT DOCUMENTS

| | | | |
|---|---|---|---|
| 7,555,708 | B2 | 6/2009 | Pandit et al. |
| 10,019,432 | B2 | 7/2018 | Rutherford et al. |
| 10,204,119 | B1 | 2/2019 | Ackner et al. |
| 10,331,947 | B2 | 6/2019 | Saurav et al. |
| 2005/0223032 | A1* | 10/2005 | Shan ............... G06F 16/258 |
| 2008/0168036 | A1* | 7/2008 | Young ............. G06F 16/2465 707/E17.037 |
| 2014/0324878 | A1* | 10/2014 | Kataoka ............ G06F 16/319 707/804 |
| 2016/0104077 | A1 | 4/2016 | Jackson et al. |
| 2017/0206191 | A1* | 7/2017 | Biegert ............... G06F 40/30 |
| 2018/0075104 | A1* | 3/2018 | Oberbreckling ...... G06F 16/254 |
| 2018/0314883 | A1* | 11/2018 | Saurav ............... G06F 18/24 |
| 2020/0125586 | A1* | 4/2020 | Rezaeian ............ G06F 3/048 |

OTHER PUBLICATIONS

"International Search Report and Written Opinion Issued in PCT Application No. PCT/US22/040384", Mailed Date: Nov. 28, 2022, 13 Pages.

"Converting Between Plain Text and Tables", Retrieved from: https://web.archive.org/web/20210425041944/https://www.gnu.org/software/emacs/manual/html_node/emacs/Table-Conversion.html, Apr. 25, 2021, 2 Pages.

Li, et al., "TableBank: A Benchmark Dataset for Table Detection and Recognition", In Journal of arXiv preprint arXiv:1903.01949, Mar. 5, 2019, 7 Pages.

Ng, et al., "Learning to Recognize Tables in Free Text", In Proceedings of the 37th Annual Meeting of the Association for Computational Linguistics, Jun. 1999, pp. 443-450.

Raiyani, Jignesh, "Converting commas or other delimiters to a Table or List in SQL Server using T-SQL", Retrieved from: https://www.sqlshack.com/converting-commas-or-other-delimiters-to-a-table-or-list-in-sql-server-using-t-sql/, Jan. 31, 2020, 10 Pages.

* cited by examiner

INTELLIGENT TABLE SUGGESTION AND CONVERSION FOR TEXT

BACKGROUND

Although text often accounts for the bulk of a typical word-processing documents, various other elements may be included in a word processing document. For instance, a word-processing document may include elements such as tables, charts, graphics, and/or the like. A table may be used in a word-processing document to organize information into rows and columns so that collection of data may be more easily viewed and understood by readers.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to the conversion of text to tables. In some examples, input text that includes at least three rows is received. In some examples, a plurality of characteristics of the input text is determined. In some examples, each characteristic of the plurality of characteristics is associated with a uniformity between the rows of the input text. In some examples, the plurality of characteristics includes at least one characteristic that is associated with a delimiter count. In some examples, a determination is made as to whether the input text is suitable for conversion to table based on the plurality of characteristics. In some examples, upon determining that the input text is suitable for conversion to a table, a machine learning model is used to convert the input text into a table.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
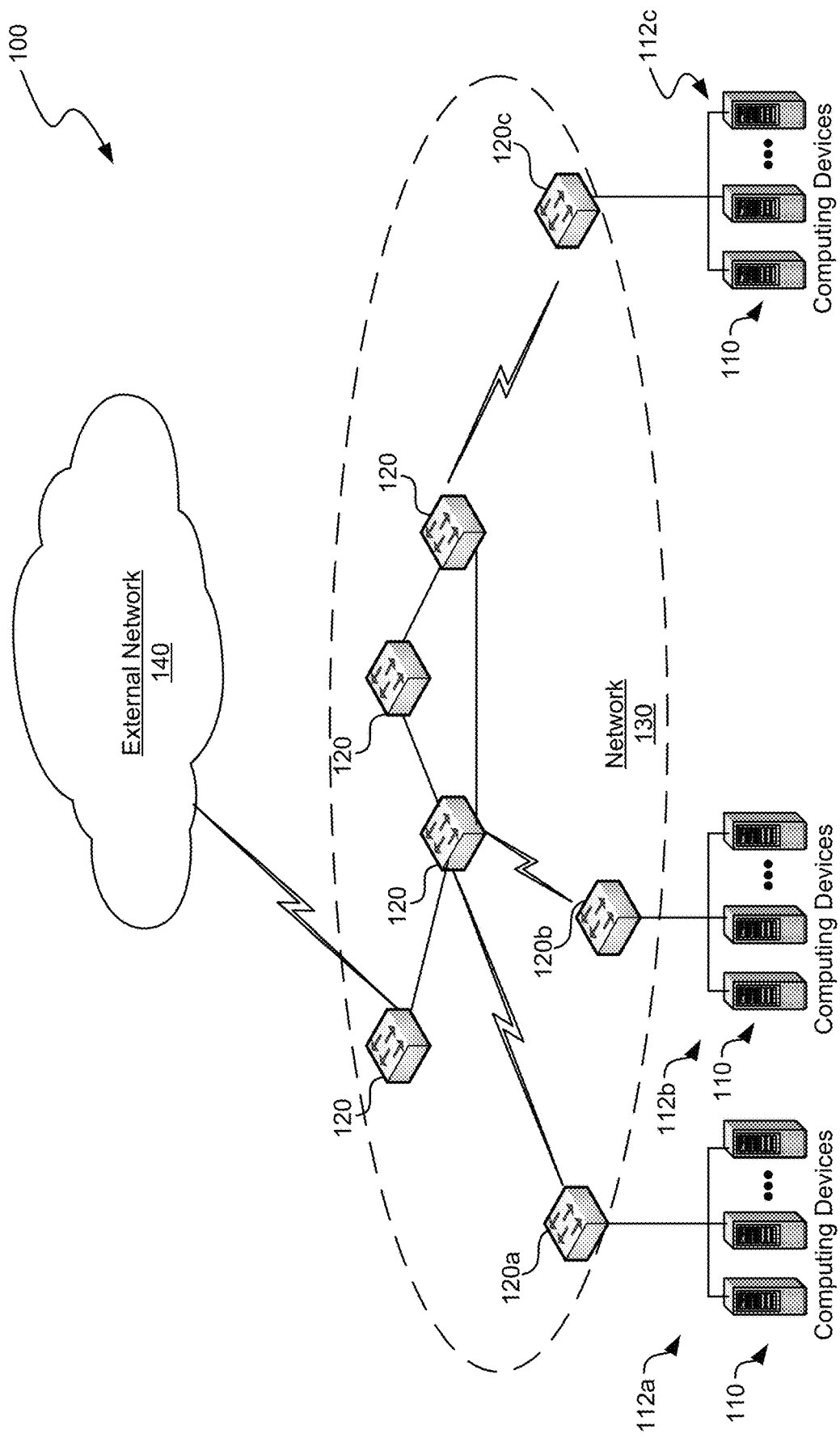
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to the conversion of text to tables. In some examples, input text that includes at least three rows is received. In some examples, a plurality of characteristics of the input text is determined. In some examples, each characteristic of the plurality of characteristics is associated with a uniformity between the rows of the input text. In some examples, the plurality of characteristics includes at least one characteristic that is associated with a delimiter count. In some examples, a determination is made as to whether the input text is suitable for conversion to table based on the plurality of characteristics. In some examples, upon determining that the input text is suitable for conversion to a table, a machine learning model is used to convert the input text into a table.

In some examples, a digital document, such as a word-processing document, or other digital document containing text, such as an email, chat message, and/or the like, may contain one or more lists, or list-like chunks of texts, that may be suitable for conversion into tables. For example, the digital document may contain one or more bulleted lists, numbered lists, chunks of text resembling lists but which are not numbered or bulleted, and/or the like.

Each such list and/or chunk of text may be sent to a table prediction service that predicts whether the input text is suitable for conversion into a table. The prediction may be a rules-based decision that is made based on various characteristics of the input text that are each associated with how much uniformity exists between the rows of the input text. The determination may be made based on delimiter usage in the input text, lengths of the rows of the input text, the presence or absence of connector words in the input text, and/or the like.

For example, the table prediction service may determine how many delimiters are contained in each row of the input text, and compare the delimiter counts among each of the rows of text in the input text in order to determine how much uniformity exists between the rows of text. In various examples, other comparisons may be made to determine the uniformity between the rows of the input text. For example, the consistency between rows of in terms of, for example lengths (e.g., character count and/or word count of the rows), the presence of connector words, and/or the like may be compared.

If the table prediction service determines that the input text is suitable for conversion to a table, the user may be prompted as to whether that text should be converted into a table. These determinations may be made automatically, without requiring user intervention. However, as stated, in some examples, if it is determined that that the input text should be converted in table, the user is prompted as to whether that text should be converted into a table. If the user indicates that the text should be converted into a table, then a trained machine-learning model may be used to intelligently convert the input text into a table.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general—or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to be part of a process for intelligent table suggestion and conversion for text.

Illustrative Computing Device

Figure 2:
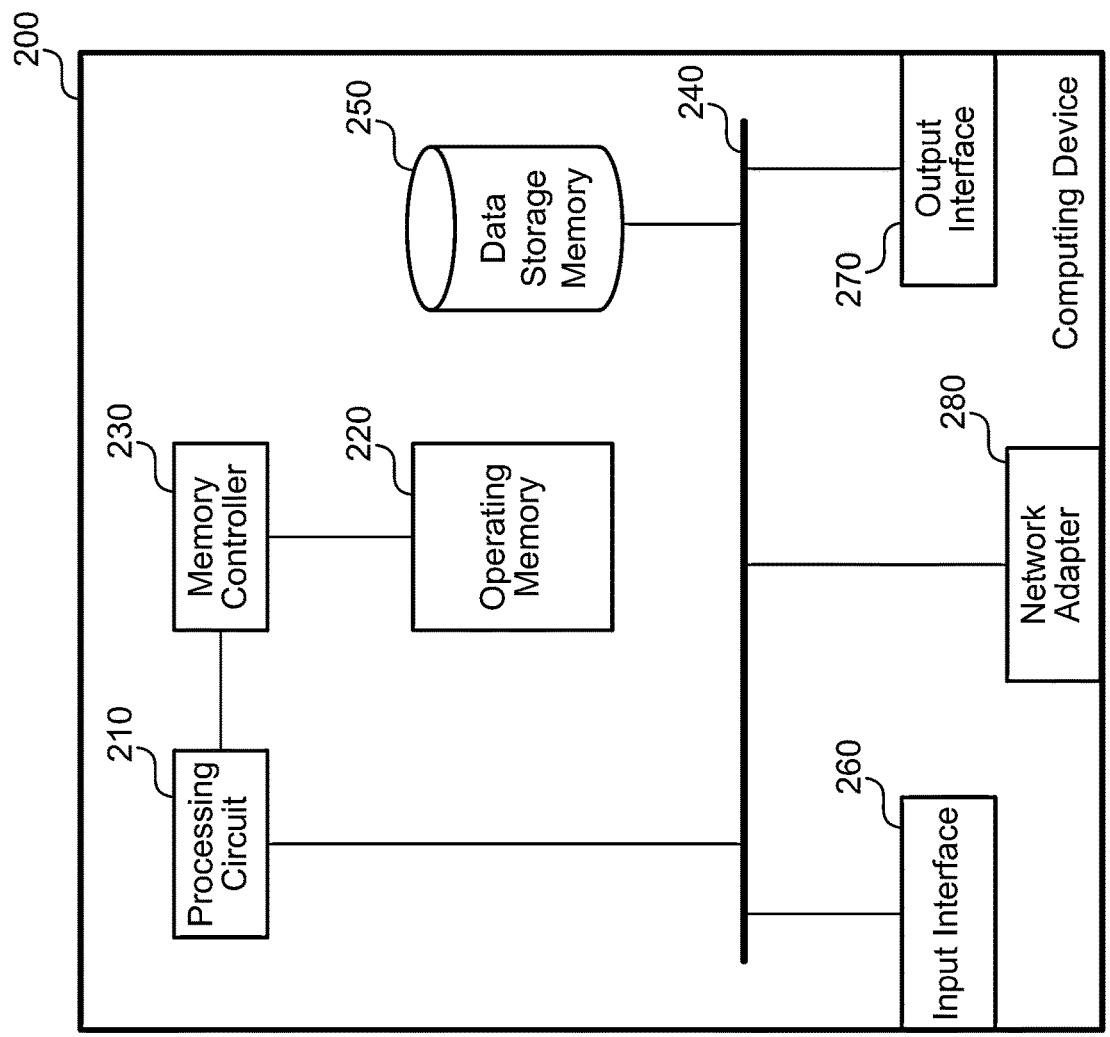
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general—or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device no or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
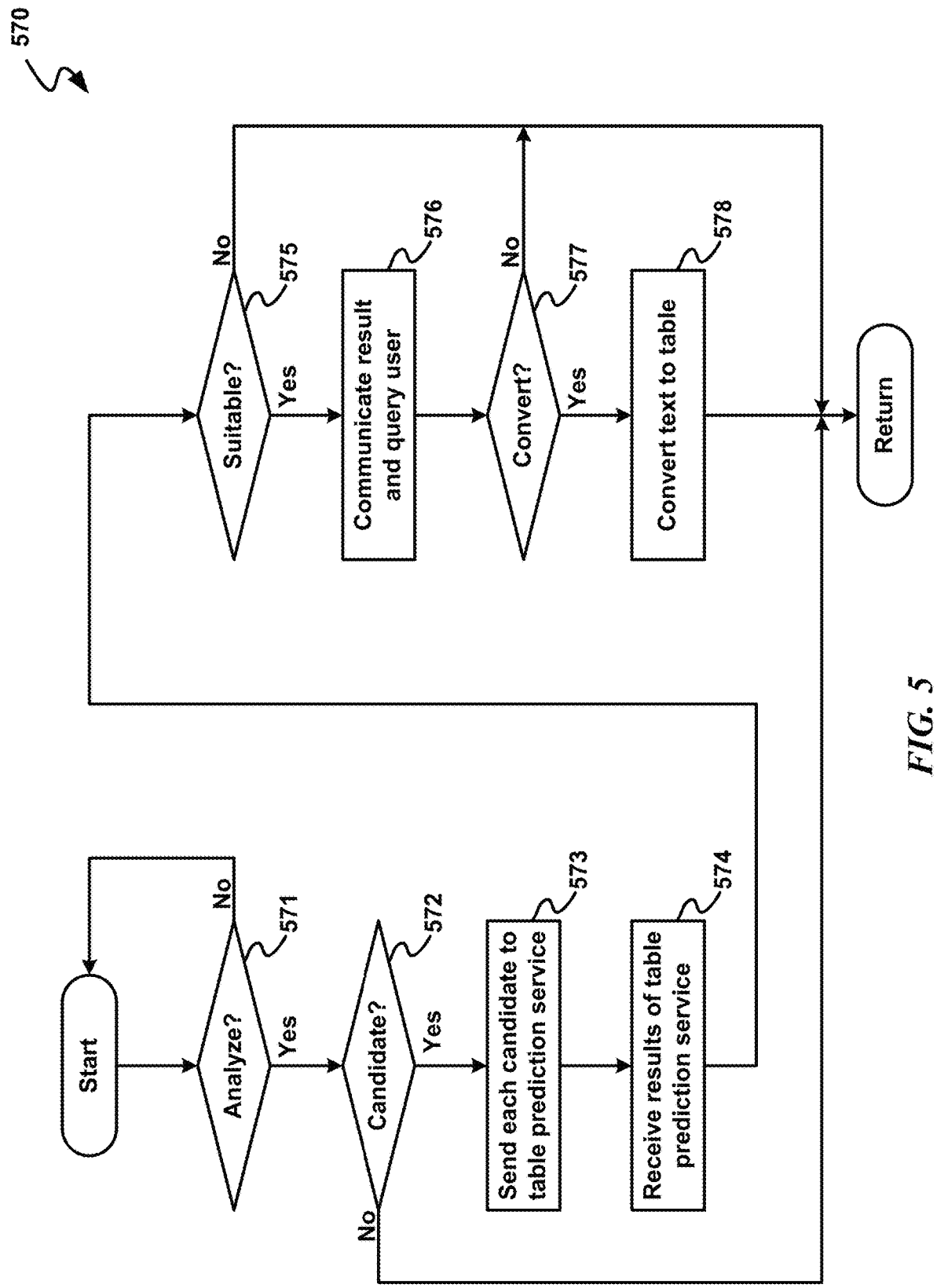
FIG. 5 is a flow diagram illustrating an example process for intelligent table suggestion and conversion for text.
Figure 6:
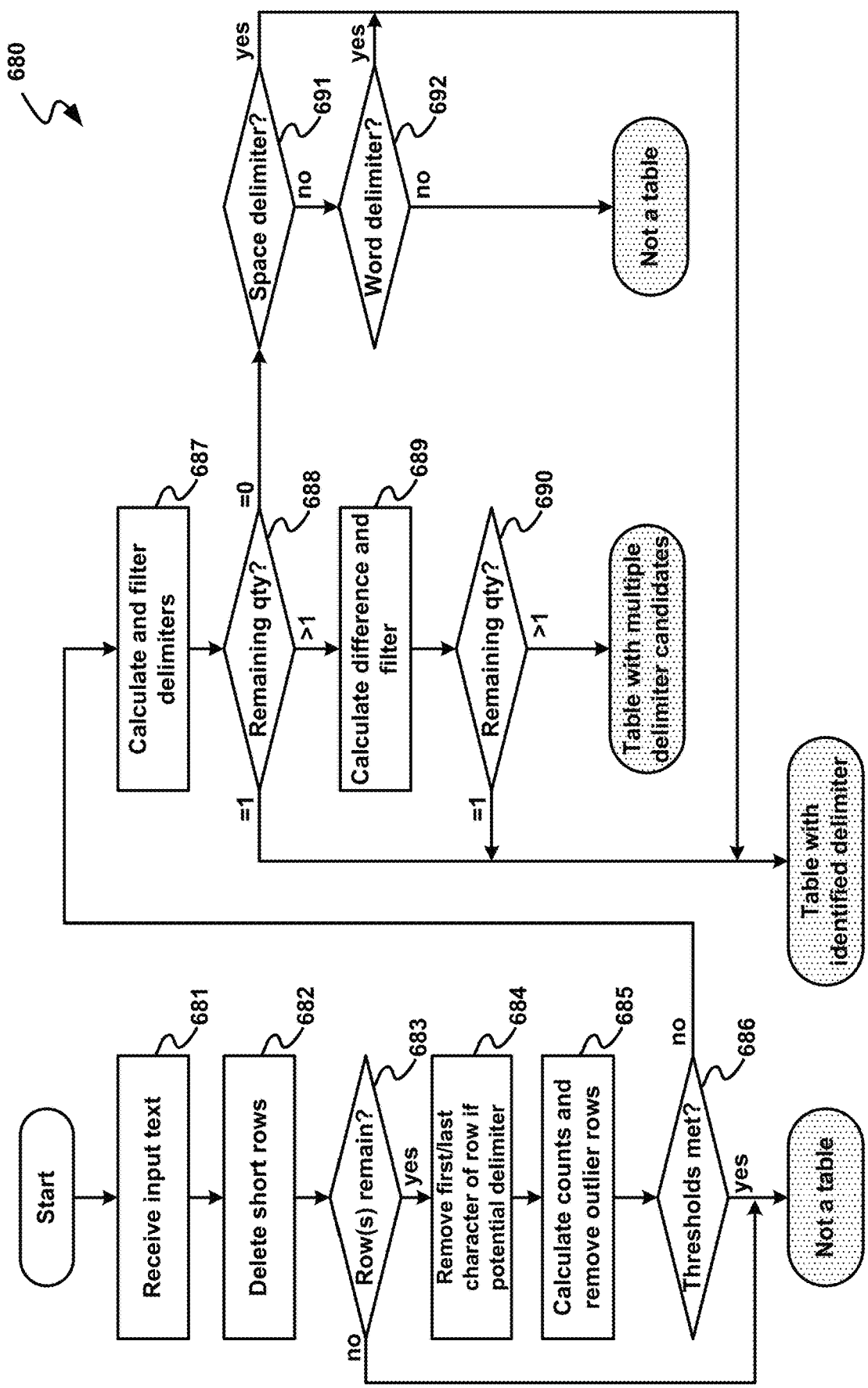
FIG. 6 is a flow diagram illustrating another example process for intelligent table suggestion and conversion for text.
Figure 7:
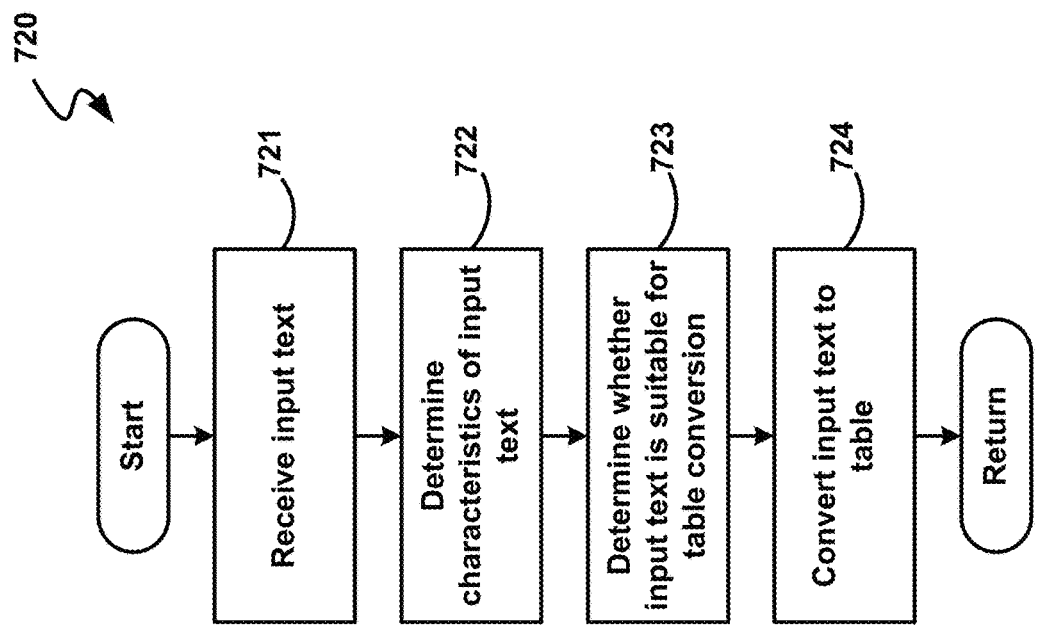
FIG. 7 is a flow diagram illustrating yet another example process for intelligent table suggestion and conversion for text, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as one or more of the processes shown in FIG. 5, FIG. 6, and/or FIG. 7, as discussed in greater detail below.

Illustrative Systems

Figure 3:
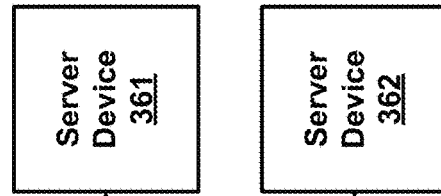
FIG. 3 is a block diagram illustrating an example of a network-connected system.
Figure 3:
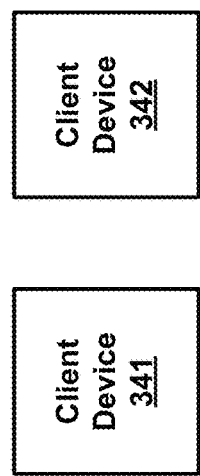
Figure 3:
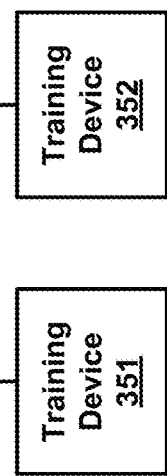

FIG. 3 is a block diagram illustrating an example of a system (300). System 300 may include network 330, as well as client devices 341 and 342; training devices 351 and 352; and server devices 361 and 362, which, in some examples, all connect to network 330.

Each of client devices 341 and 342; training devices 351 and 352; and server devices 361 and 362 may include examples of computing device 200 of FIG. 2. FIG. 3 and the corresponding description of FIG. 3 in the specification illustrate an example system for illustrative purposes that does not limit the scope of the disclosure. In some examples, training devices 351 and 352 are part of one or more distributed systems, and server devices 361 and 362 are part of one or more distributed systems.

In some examples, client devices such as client device 341 or client device 342 may be used by clients to make use of various applications. Some of the applications may include word processor applications, and/or other applications that enable clients to work with documents containing text, such as email clients, chat applications, and/or the like. In some examples, training devices 351 and 352 may be part of one or more distributed systems that are arranged to fine-tune algorithms for converting input text, which may include, for example, a list or a list-like set of text, into a table. In some examples, server devices 361 and 362 may provide one or more services on behalf of one or more client devices, such as client devices 341 and 342.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342; training devices 351 and 352; and server devices 361 and 362. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

In some examples, a distributed system that includes devices, such as training devices 361 and 362, may train a table conversion algorithm. In some examples, the table conversion algorithm may use a pre-trained model as a base, a classification layer may be applied, and then the distributed system that is performing the training may fine-tune the model for text-to-table conversion. In other examples, the table conversion algorithm may be trained in other suitable ways.

After the table conversion algorithm is trained, the table conversion algorithm may be communicated to one or more other devices, such as one or more of client devices 341 and/or 342.

An application on client device, such as client device 341 or 342 of FIG. 3, may communicate input text to a table prediction service residing on one or more server devices, such as server devices 361 and/or 362 of FIG. 2. The input text may be a bulleted list, a numbered list, other suitable list, a chunk of text resembling a list but that is not numbered or bulleted, and/or the like. For instance, in some examples, the application on the client device may periodically determine whether any suitable input text should be sent to the table prediction service.

In some examples, the table prediction service may determine whether the input text should be converted into a table, and communicate the determination to the client device that sent the input text. In some examples, if the determination is positive, the application may query the user whether to convert the text into a table. If so, the application may use the table conversion algorithm to convert the text into a table.

System 300 may include more or less devices than illustrated in FIG. 3, which is shown by way of example only.

Figure 4:
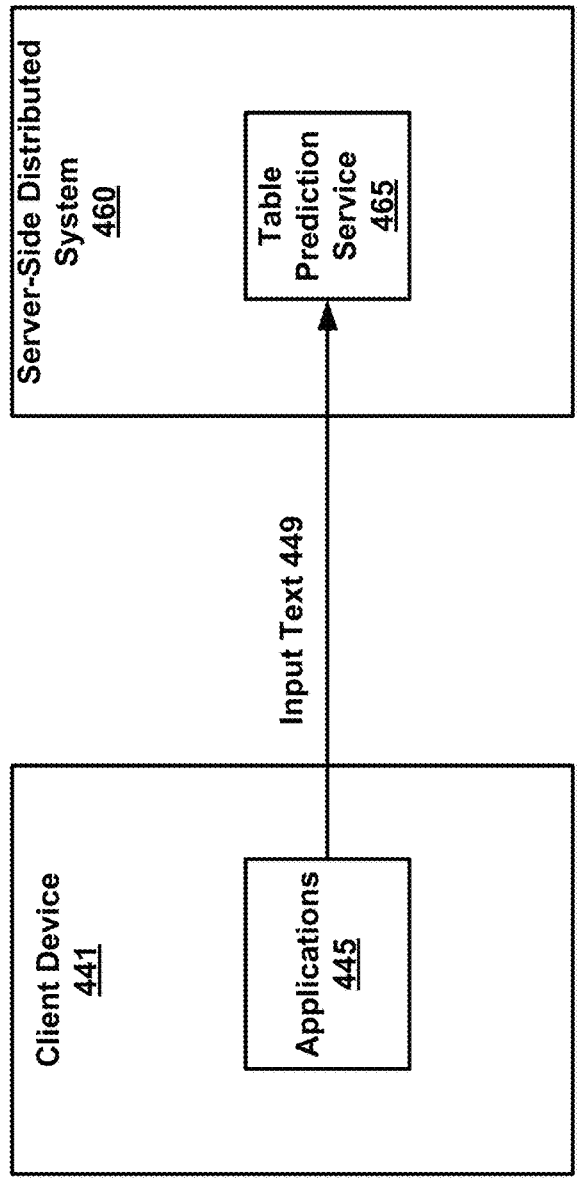
FIG. 4 is a block diagram illustrating an example of a system for intelligent table suggestion and conversion for text.

FIG. 4 is a block diagram illustrating an example of a system (400). System 400 may be an example of a portion of system 300 of FIG. 3. System 400 may be a system for intelligent table suggestion and conversion of text. System 400 may include client device 441 and server-side distributed system 460. In some examples, server-side distributed system 460 includes two or more devices. Distributed system 460 may be capable of executing table prediction service 465. In some examples, a single device may be used in place of distributed system 460. Client device 441 may be capable of executing one or more applications 445.

One or more of applications 445 may store a word-processing document, and/or other digital documents containing text, such emails, chat messages, and/or the like. One of more of these applications 445 may communicate input text 449 to table prediction service 465. In some examples, one or more of the applications 445 may periodically determine whether any suitable input text should be sent to table prediction service 465. Input text 449 may be a bulleted list, a numbered list, other suitable list, a chunk of text resembling a list but that is not numbered or bulleted, and/or the like. In some examples, input text is a set of text that includes at least three rows of text.

In some examples, table prediction service 465 may determine whether input text 449 should be converted into a table, and communicate the determination to client device 441. In some examples, if the determination is positive, then the application 445 may query the user whether to convert the text into a table. If so, the application 445 uses a table conversion algorithm to convert the text into a table.

In some examples, table prediction service 465 determines whether the text should be converted into a table based on how much uniformity and/or consistency exists between rows of text of the input text 449. In some examples, if the uniformity between the rows of text among the rows of the input text 449 is sufficient, and the input text 449 is otherwise suitable for conversion into a table, then table prediction service 465 determines that the text should be converted into a table. Table prediction service 465 may make this determination by performing one or more comparisons between characteristics of the input text 449, where the characteristics may be associated with uniformity among the rows of text. For instance, in some examples, table suggest service 465 may make comparisons between the rows of text based on characteristics such as the delimiters counts of each row, the word counts of each row, the presence of the connector words in input text 449, and/or other suitable characteristics.

Both FIG. 3 and FIG. 4 included discussion of examples of particular actions occurring in a client device, and particular actions occurring in a server device. However, in various examples, the particular actions discussed may be performed in any suitable device. For instance, in some examples, some, all, or none of the actions described as occurring in the client device may instead occur in a server device, and vice versa.

Illustrative Processes

FIG. 5 a diagram illustrating an example dataflow for a process (570) for intelligent table suggestion and conversion for text. In some examples, process 570 may be performed by an example of an application 445 on client device 441 of FIG. 4, by an example of client device 341 of FIG. 3, by an example of device 200 of FIG. 2, by two or more devices from the above figures, or the like.

In some examples, process 570 may be performed for a digital document that might include text that might be suitable for conversion into a table. In some examples, the digital document may be a word-processing document, an email, a chat message, a document associated with a collaborative, cross-application component; or other suitable digital document.

After a start block, in some examples, the process proceeds to decision block 571. At decision block 571, in some examples, a determination is made as to whether a current digital document should be analyzed for text-to-table conversion. This determination may be made in various ways in various examples. For instance, in some examples, the current digital document may be analyzed for text-to-table conversion at periodic time intervals, such as once every thirty seconds, once every minute, or at other suitable time intervals. In other examples, the determination may be made in other suitable ways based on other suitable schemes for determining the timing as to when a digital document should be analyzed for text-to-table conversion. In some examples, the manner of the determination of the timing, such as the duration of the periodic interval, and/or other factors, may be adjustable by the user, such as in a settings menu or in another suitable way.

In some examples, if the determination at decision block 571 is negative, then the processing remains at block 571 until a positive determination is made that the digital document should be analyzed for text-to-table conversion. In some examples, if the determination at decision block 571 is positive, then the processing proceeds to decision block 572, where a determination is made as to whether the document includes any sets of text that are candidates for possible text-to-table conversion. In some examples, the entire document may be scoured through, using various filters in order to determine whether the document includes any such candidates. In some examples, such candidates may include lists (such as bulleted lists, numbered lists, or the like), new-line-delimited sequences of text, and/or the like. In some examples, new-line-delimited sequences of text may be similar to bulleted lists or numbered lists, except that they do not include any bullet or number in front of each element.

In some examples, tables already present in the document are not identified as candidates, because valid candidates are sets of text that are not tables that are candidates to be converted into a table. In some examples, in considering whether a sequence of text is a candidate for possible text-to-table conversion, sequences of text are also evaluated based on the number of rows and number of characters in the sequence of text, and are rejected as candidates if the number of rows or the number of characters is too small. In some examples, if the determination at decision block 572 is negative, then the processing advances to a return block, where other processing is resumed.

In some examples, if instead the determination at decision block 572 is positive, then the processing moves to block 573, where each candidate determined at decision block 572 is sent to a table prediction service. In some examples, each candidate is a set of text that includes at least three rows. In some examples, the processing then proceeds to block 574, where the results of the table prediction service are received. In some examples, for each candidate, the results include an indication as to whether the candidate should be converted into a table. In some examples, if the results indicate that a candidate set of text should be converted into a table, the results also indicate which delimiter or delimiters should be used for column separation if the text is converted into a table.

In some examples, the processing then proceeds to decision block 575, where a determination is made as to whether the results indicate that at least one of the candidates should be converted into a table. In some examples, if the determination at decision block 575 is negative, then the processing advances to the return block, where other processing is resumed. In some examples, if instead the determination at decision block 575 is positive, then the processing instead moves to block 576, where an indication is sent to the user that the text that should be converted to a table, and the user is queried as to whether the user would like the text to be converted into a table.

In some examples, the processing then advances to decision block 577, where a determination is made as to whether the user indicated that the user would like the text to be converted into a table. In some examples, if the determination at decision block 577 is negative, then the decision advances to the return block, where other processing is resumed. In some examples, any set of text for which the user indicated that the user does not wish to be converted into a table is flagged to not be checked again for possible conversion into a table.

In some examples, if instead the determination at decision block 577 is positive, the processing proceeds to block 578, where set of text that the user indicates that the user would like to be converted into a table, is converted into a table. The processing of converting the text into a table is discussed in greater detail below.

FIG. 6 is a diagram illustrating an example dataflow for a process (680) for intelligent table suggestion and conversion for text. FIG. 6 shows, and the accompanying text describing FIG. 6 discusses, a particular example of process 680 for illustrative purposes; in other examples, process 680 may be different in various suitable ways. In some examples, process 680 may be performed by an example of table prediction service 465 on server-side distributed service 460 of FIG. 4, by an example of server device 461 and/or 462 of FIG. 3, by the table prediction service referred to in the discussion of process 570 of FIG. 5, by an example of device 200 of FIG. 2, by two or more devices from the above figures, or the like.

In some examples, process 680 is performed on input text. In some examples, the input text is a set of text that is a candidate for possible conversion into a table, for which process 680 determines whether or not the input text is suitable for conversion into a table. In some examples, the input text for process 680 may be performed on a determined part of received text rather than upon all of the received text.

In some examples, the input text is a sequence of new-line-delimited text that includes at least three rows. In some examples, each row of text is separated from each other row of text by a new-line delimiter. In other examples, the rows may be separated from other rows in other suitable manners. In some examples, a single row of text may consist of multiple lines. One example of suitable input text is a bulleted list. In this example, each element of the bulleted list is a row. Another example of suitable input text is a numbered list. In this example, each element of the numbered list is a row.

In general, in some examples, the rows of the input text are the elements in a list such as a bulleted list, a numbered list, or other similar list, or the equivalent of list elements in a sequence of text that is not a list. Another example of suitable input text is a new-line-delimited sequence of text that is similar to a bulleted list or a numbered list except that, unlike a bulleted list or a numbered list, each element of the new-line-delimited sequence of text is not bulleted and is not numbered. In some examples of new-line-delimited sequences of text, each new-line delimiter is used to designate the end of the current row and the beginning of the next row.

Example 1 below shows an example of a bulleted list that may be used as suitable input text for an example of process 680.

Example 1

Romani: 300,000-350,000
Aromanians: 200,000
Arvanites: 200,000
Slavophones: 100,000-200,000, including 10,000-30,000 with a Macedonian national identity
Muslims: 90,000, including 50,000 Turkish, 30,000 Pomak and 10,000 Romani speakers
Jews: 5,000

Example 1 is a bulleted list, where each row is an element of the bulleted list. In example 1, the bulleted list is comprised of text that contains six rows, as follows. The first row is: "Romani: 300,000-350,000." The second row is: "Aromanians: 200,000." The third row is: "Arvanites: 200,000." The fourth row is: "Slavophones: 100,000-200,000, including 10,000-30,000 with a Macedonian national identity." The fifth row is: "Muslims: 90,000, including 50,000 Turkish, 30,000 Pomak and 10,000 Romani speakers." The sixth row is: "Jews: 5,000."

As shown, in Example 1, the fourth row consists of two lines of text, but still considered to be a single row, because the fourth row is one element of the bulleted list. Similarly, in Example 2, the fifth row consists of two lines of text, but still considered to be a single row, because the fifth row is one element of the bulleted list.

The bulleted list of Example 1 can be converted into a table, for example as shown here in Example 2:

Example 2

| | | |
|---|---|---|
| Romani | 300,000 | 350,000 |
| Aromanians | | 200,000 |
| Arvanites | | 200,000 |
| Slavophones | 100,000 | 200,000, incl. 10,000-30,000 Macedonians |
| Turks | 49,000 | 50,000 |
| Pomaks | 34,000 | 30,000 |
| Jews | | 5,000 |

Example 3 below shows an example of suitable input text that is neither a list nor a new-line-delimiter, but which is suitable input text, because it includes multiple rows of text—in Example 3, the rows are separated only by whitespace.

Example 3

Stella Kinsley CHRO Intuit Inc. 2000-2003
Neha forward Compass Bancshares Inc 1961
Aliyya Accardi offensive tackle Viasystems Group Inc 1944-1948
Dharma Mahesh Toselli defender Nabors Industries Inc 1994-1996
*Julia* Ardashir Cermak CKO La-Z-Boy Inc. 1975-1977
Voislav Maxmilanus Lindsay CHRO Kellogg Company 1965-1967

If the text of Example 3 were used as the input text, then the input text could be into a table, for example as shown here in Example 4:

Example 4

| | | | |
|---|---|---|---|
| Stella Kinsley | CHRO | Intuit Inc. | 2000-2003 |
| Neha | forward | Compass Bancshares Inc | 1951-1955 |
| Aliyya Accardi | offensive tackle | Viasystems Group Inc | 1944-1948 |
| Dharma Mahesh Toselli | defender | Nabors Industries Inc | 1994-1995 |
| Julia Ardashir Cermak | CKO | La-Z-Boy Inc. | 1975-1977 |
| Voislav Maxmilanus Lindsay | CHRO | Kellogg Company | 1955-1957 |

In some examples, a table is a grid of cells arranged in rows and columns. The cells need not have visible borders, although they may. In some examples, tables may be useful for various tasks such as presenting text information and numerical data in an organized manner.

For instance, it can be seen that Example 2 and Example 4 are both tables, because, in these examples, the data is arranged in a grid of rows and columns. In contrast, it can be seen that neither Example 1 nor Example 3 is a table, because, in these examples, the data is not in a grid of cells arranged in rows and columns.

While Example 1 and Example 3 shows examples of sets of data that may suitably be used as input text, not all sets of text are necessarily suitable for use as input text for process 680. Typical writing in standard paragraph format, in contrast to lists and sets of text that are similar to lists, are not necessarily suitable for conversion to a table. For instance, in some examples, most of the paragraphs in this document would not be suitable for conversion to a table, and would not be used as input text for process 680.

As another example, an existing table is not suitable for input text to process 680. In some examples, process 680 is used for input text that is possibly a suitable candidate for converting the text into a table. In some examples, an existing table is not suitable as input text for process 680, because input text 680 is a set of text that is not a table but which is a candidate for possibly being to be converted from its current non-table format into a table. For this reason, in some examples, Example 2 and Example 4 would not be used as input text for process 680, because Example 2 and Example 4 are already tables.

In some examples, after a start block, the processing begins with block 681, where input text is received. The remaining steps include several steps which modify the input text in some examples. In some examples, this may refer to modification of a version of the input text to be used for analysis, not to modification of the original input text itself. In some examples, the process then proceeds to block 682, where each row in the input text containing two or less characters is deleted. In some examples, a threshold number of characters other than two characters may be used instead. In some examples, this may avoid any bias created by empty or near-empty rows when compared to other longer rows in the input text.

In some examples, the process then advances to decision block 683, where a determination is made as to whether any rows are remaining in the input text. In some examples, if the determination at decision block 683 is negative, the processing determines that the input text should not be converted to a table, the output result for the input text is provided accordingly and then other processing is resumed. In some examples, if instead the determination at decision block 683 is positive, the process proceeds to block 684, where, for each of the first and last characters of each row of the input text, that character is removed if the character is part of a defined set of delimiters.

In some examples, defined set of delimiters is a set of commonly-found delimiters, such as different kinds of punctuation, or the like. In some examples, the defined set of delimiters is the following: [",", " . . . ", ";", ":", "-", "—", "—", "→", "/", "|", "‖", "(", "[", "<", "{", "+"]. However, the defined set of delimiters may be different in different examples. In various examples, the defined set of delimiters may exclude some of the delimiters shown in the preceding list, and/or may include one or more suitable delimiters not shown in the preceding list.

In some examples, such delimiters are removed to avoid biasing prediction where the punctuation as the first or list character may be used to designate the beginning or end of a sentence rather than an indication of multiple kinds of information to be brought together. Also, in some examples, if the first/last character of rows is only among the more than 1 delimiters in the rows, then subsequent heuristics used in some examples, would be able to detect them anyway, so that the loss of the first/last character at step 685 does not negatively affect the prediction.

In some examples, the process then moves to block 685, where the character count of each row in the input text is determined, and the word count of each row in the input text is determined. In some examples, the rows that have an outlier character count are removed, and rows that have an outlier word count are removed. Outlier counts may be determined in different suitable ways in different examples.

For instance, in some examples, for both the character and word count, outliers are determined as follows. First, the first and third quartiles (the $25^{th}$ and $75^{th}$ percentile, respectively) are determined. Next the Inter-Quartile Range is calculated as the difference between the third and first quartiles. Next, any row with a count value greater than or equal to the sum of the third quartile value and 1.5 times the interquartile range is designated at an outlier.

In some examples, the input text can have varying lengths of rows inside the text, and sometimes, exceptionally large rows could potentially bias the prediction and predict that the list should not be converted into a table even if all of the other rows follow a tightly defined pattern. The removal of outliers may avoid this in some examples. In some examples, the process then proceeds to decision block 686.

At decision block 686, in some examples, a determination is made based on three different thresholds, as discussed in greater detail below. If any of the three thresholds are met (as discussed below), then, in some examples, the processing determines that the result for the input text is that the input text is not suitable for conversion to a table, and then other processing is resumed. If instead none of the three thresholds are met (as discussed below), then, in some examples, processing instead proceeds to block 687. In some examples, decision block 686 includes three determinations regarding three thresholds, as follows.

First, at decision block 686, in some examples, a determination is made as to whether the difference between the maximum character count among each of the rows and the minimum character count among all of the rows is greater than a determined character count difference threshold. In some examples, the determined character count difference threshold is ten. In other examples, other suitable values for the character count difference threshold may be used. If the first determination at decision block 686 is positive, then, In some examples, the processing determines that the result for the input text is that the input text is not suitable for conversion to a table, and then other processing is resumed.

Second, at decision block 686, in some examples, a determination is also as to whether the difference between the maximum word count among each of the rows and the minimum word count among all of the rows is greater than a determined word count difference threshold. In some examples, the determined word count difference threshold is ten. In other examples, other suitable values for the character word difference threshold may be used. If the second determination at decision block 686 is positive, then, in some examples, the processing determines that the result for the input text is that the input text is not suitable for conversion to a table, and then other processing is resumed.

Third, in some examples, a determination is also made as to whether the number of rows that contain just one word exceeds a single-word-row threshold. In some examples, the single-word-row threshold is 50%. In other examples, other suitable values for the single-word-row threshold may be used. In some examples, if the third determination at decision block 686 is positive, then the processing determines that the result for the input text is that the input text is not suitable for conversion to a table, and then other processing is resumed.

If instead the results of all three determinations at decision block 686 are negative, then in some examples, the process instead proceeds to block 687, where calculations and filtering related to delimiters is performed. First, in some examples, for each row in the input text, for each delimiter in the row, the number of that delimiter in the row is calculated. In some examples, the same pre-defined list of delimiters used for block 684 is used to determine what qualifies as a delimiter for the purposes of determined the number of delimiters in each row at decision block 687. Additionally, in some examples, a filtered delimiter count is determined for each row, where the filtered delimiter count is filtered to include only those delimiters that occur in at least a delimiter threshold of rows. In some examples, the filter delimiter is 50% of the rows. In other examples, other suitable values may be used for the delimiter threshold.

In some examples, the process then moves to decision block 688, where a determination is made as to how many delimiters remain after the filtering performed at block 687. In some examples, if at decision block 688 it is determined that exactly one delimiter remains, then the processing determines that the result for the input text is that the text is suitable for conversion to a table, an indication is made that the remaining delimiter after filtering should be used as the delimiter for the table conversion, and then other processing is resumed.

In some examples, if instead the determination made at decision block 688 is that more than one delimiter remain, then the processing moves to block 689. In some examples, at block 689, for each of the remaining filtered delimiters, the difference between the maximum count of delimiters among all rows and the minimum count of delimiters in all rows is determined. In some examples, this may be used to quantify the uniformity of the delimiter presence among the rows in the input text. Next, in some examples, it is determined which delimiter had the minimum difference calculated. In some examples, in the case of a tie, each of the delimiters having the minimum difference is considered to have the minimum difference. In some examples, each delimiter that does not have the minimum difference is filtered out.

In some examples, the processing then proceeds to decision block 690, where a determination is made as to how many delimiters remain after the filtering performed at block 689. In some examples, if at decision block 690 it is determined that exactly one delimiter remains, then the processing determines that the result for the input text is that the text is suitable for conversion to a table, an indication is made that the remaining delimiter after filtering should be used as the delimiter for the table conversion, and then other processing is resumed.

In some examples, if the determination at decision block 690 is instead that more than one delimiter remains, then the result for the input text is that the text is suitable for conversion to a table, an indication is made that one or more of the remaining delimiters after filtering should be used as the delimiter(s) for the table conversion, and then other processing is resumed.

In some examples, blocks 687-690 may act to determine overall patterns of delimiters on the whole, rather than simply looking at the delimiter in each row separately. In some examples, blocks 687-690 may serve to effectively eliminate outlier delimiters in common cases and pull the patterns closer to a center of uniformity.

In some examples, if at decision block 688 it is determined that no delimiters remain, then the process instead proceeds to decision block 691. At decision block 691, in some examples, each remaining row of the input text is split by the space character. In some examples, this may assist in determining whether the space character could act as the delimiter. In some examples, next, a determination is made as to whether more than a character-type threshold of rows includes a piece that has at least one number but no letter. In some examples, the character-type threshold is 50%. In other examples, other suitable values for the character-type threshold may be used. In some examples, the determination at decision block 691 is performed because if the fraction of rows with a piece in them that has a number in it but no letter in it is greater than or equal to the threshold for number appearance, then process 680 determines that the list is suitable for conversion to a table due to the detected presence of a number.

In some examples, this prediction is made based on the following two reasons, as follows. First, if a set of rows all have a piece with a number but no letter in it, this fact could indicate that the input text is suitable for conversion to a table representing a statistic and a figure representing that statistic (such as a percentage or a count of different things), or an extension of the same. Second, even if all the pieces in the rows are numbers and there are no alphabetic characters in the row anywhere, it may be more likely that the text is more suitable as a table representing different numerical figures based on a central theme, rather than a set of numbers written without any punctuation separation between them.

In some examples, if the determination at decision block 691 is positive, then the processing determines that the result for the input text is that the text is suitable for conversion to a table, and an indication is made that "space" should be used as the delimiter for the table conversion, and other processing is resumed. In some examples, if instead the determination at decision block 691 is negative, the process instead proceeds to decision block 692.

In some examples, at decision block 692, a determination is made as to whether a connector word in the input text is suitable for use as a delimiter. In some examples, a determination is made as to whether more than a connector threshold of rows contain the connector word from among a defined set of connector words. In some examples, the defined set of connector words may include words such as "like," "as," "on," and/or other connectors words that may be suitable for use as delimiters. The defined set of connector words may be different in different examples. In some examples, the connector threshold is 50%. In other examples, other suitable values for the connector threshold may be used. If the determination at decision block 692 is negative, then in some examples, the processing determines that the result for the input text is that the input text is not suitable for conversion to a table, and other processing is resumed.

In some examples, if instead the determination at decision block 692 is negative, then the processing determines that the result for the input text is that the input text is suitable for conversion to a table, an indication is made that the connector words that exceeded the connector threshold at decision block 634 should be used as the delimiter for the table conversion, and then other processing is resumed.

In some examples, after a result is obtained from the input text, the entity that sent the input text can act accordingly.

For instance, in some examples, an application in Application 445 of FIG. 4 may perform process 570 of FIG. 5. As shown in FIG. 5, at block 573, a candidate set of text may be sent to a table prediction service, such as table prediction service 465 of FIG. 4. In some examples, upon receiving the candidate set of text, table prediction service 465 may perform process 680 of FIG. 6. Table prediction service 465 may then output the result for the input text, and the result may be communicated from table prediction service 465 of FIG. 4 to the application in Application 445 that sent the text to table prediction service 465. As discussed above, in some examples, the application performs process 470 of FIG. 4, and sends text to a table prediction service at block 573. In some examples, the result, output by table prediction service 465, may be received at block 574 of FIG. 5.

As shown in FIG. 5 if the results indicate that the text is suitable for conversion to a table, and the user indicates that the user would like the text to be converted into a table, then at block 578, the text may be converted into a table. In some examples, the conversion is performed without the need for user intervention, apart from the query to the user at block 576 as to whether the user wishes the text to be converted to a table. In some examples, the user does not need to use the same delimiter between all "columns" in their unstructured text, and the user need not specify which delimiter to use in converting the text into a table.

In this way, some examples intelligently suggest and then convert lists, and/or sets of texts similar to lists, into tables. In some examples, no user effort or intervention is required, and various examples can also work with a large subset of cases. For example, in some examples, the table suggestion and conversion can both succeed when there is whitespace delimiting the column text, when there are different delimiters used between different columns, and/or when the delimiter character (e.g., a comma) is also found within the text of what will become a cell when the table version is complete Also, in some examples, rather than output a table that splits on every single comma in the input text, in some examples, the table conversion can more intelligently determine which commas to split on.

As discussed above, in some examples, process 680 not only predicts whether the input text is suitable for conversion for a table, but when process 680 predicts that the input text is suitable for conversion to a table, process 680 also determines which delimiter (or delimiters) should be used to separate the columns in each row of the output table if the input text is converted to an output table. For instance, in the example of process 680 illustrated in FIG. 6, blocks 694, 698, 699, 633, and 635 each determine a delimiter to be used for column separation if the input text or suitable for conversion to a table (or possibly multiple delimiters, in the case of block 699).

In some examples, a neural network is used to perform machine learning to perform text-to-table conversion. Among other things, the machine learning may be used to learn how to determine where the text should be split to create a new column. In some examples, the machine learning is used to learn a binary value for each word or each character, where the binary value indicates whether or not the word or character is the last word or the last character in a cell of the output table (when converting text into a table).

More specifically, in some examples, natural language processing (NLP) models are used for the text-to-table conversion—more specifically, Text Segmentation by Token Classification in some examples. In some examples, tokens are individual pieces of language that have some semantic meaning. In some examples, the conversion model works by tokenizing text (e.g. "The dog jumped!" could be tokenized as ["The", "dog", "jump", "##ed", "!"]) and then predicting where the text should be split to form the columns. In some examples, the tokens which signify the end of a cell are labeled as "1" and other tokens are labeled as "o". Accordingly, in some examples, the model performs binary classification for each token in the input text.

In some examples, in order to achieve this, a pre-trained model is used as base, then a classification layer is applied to the model, and then the model is fine-tuned. In some examples, the pre-trained model is BERT (Bidirectional Encoder Representations from Transformers). In other examples, another suitable pre-trained model other than BERT may be used. The fine-tuning of the model may be accomplished with examples of text to be converted to table with corresponding ground truths indicating the correct result when the text is converted into a table. In some examples, the model may be trained based on publicly available data in which text has been converted into a table. In some examples, when fine-tuning the model, a loss function is used that combines cross-entropy loss with a term that is used to promote a consistent number of columns being predicted across rows in the same table.

FIG. 7 is a diagram illustrating an example dataflow for a process (720) for intelligent table suggestion and conversion for text. FIG. 7 and the corresponding description of FIG. 7 in the specification illustrate an example process for illustrative purposes that do not limit the scope of the disclosure.

In the illustrated example, first, step 721 occurs. At step 721, in some examples, input text that includes at least three rows is received. As shown, step 722 occurs next in some examples. In step 722, in some examples, a plurality of characteristics of the input text is determined (this determination may include a determination of a delimiter count). In some examples, each characteristic of the plurality of characteristics is associated with a uniformity between the rows of the input text. In some examples, the plurality of characteristics includes at least one characteristic that is associated with a delimiter count.

As shown, step 723 occurs next in some examples. In step 723, in some examples, a determination is made as to whether the input text is suitable for conversion to table based on the plurality of characteristics. As shown, step 724 occurs next in some examples. In step 724, in some examples, upon determining that the input text is suitable for conversion to a table, a machine learning model is used to convert the input text into a table. In some examples, the process then advances to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
    a device including at least one memory having processor-executable code stored therein, and at least one processor that is adapted to execute the processor-executable code, wherein the processor-executable code includes processor-executable instructions that, in response to execution, enable the device to perform actions, including:

receiving input text;
determining whether the input text includes at least three rows;
based on determining that the input text includes at least three rows, determining a plurality of characteristics of the input text, wherein each characteristic of the plurality of characteristics is associated with a uniformity between the rows of the input text, and wherein the plurality of characteristics includes at least one characteristic that is associated with a delimiter count;
making a determination as to whether the input text is suitable for table conversion based on the plurality of characteristics; and
in response to determining that the input text is suitable for conversion to a table, using a machine-learning model to convert the input text into a table.

2. The apparatus of claim 1, wherein upon determining that the input text is suitable for conversion to a table, before using the machine-learning model to convert the input text into the table, the user is queried as to whether to convert the input text into the table.

3. The apparatus of claim 1, wherein the plurality of characteristics further includes lengths of the rows of the input text.

4. The apparatus of claim 1, wherein making a determination as to whether the input text is suitable for table conversion based on the plurality of characteristics is further based on a minimum character count and a minimum word count in each row being met.

5. The apparatus of claim 1, the actions further including:
providing the machine-learning model by applying a classification layer to a pre-trained model, and then fine-tuning the model for text-to-table conversion.

6. The apparatus of claim 1, the actions further including:
identifying a delimiter in the input text to be used for column separation in converting the input text into the table.

7. The apparatus of claim 1, wherein making the determination as to whether the input text is suitable for table conversion includes:
removing rows from the input text having at least one of an outlier word count or an outlier character count;
determining, from the remaining rows of the input text, whether a first difference between a maximum character count of the rows and a minimum character count of the rows is greater than a first threshold;
determining, from the remaining rows of the input text, whether a second difference between a maximum word count of the rows and a minimum word count of the rows is greater than a second threshold;
if it is determined that the first difference is greater than a first threshold, determining that the input text is not suitable for table conversion;
if it is determined that the second difference is greater than a second threshold, determining that the input text is not suitable for table conversion; and
if it is determined that the first difference is not greater than a first threshold and the second different is not greater than a second threshold, determining whether the input text is suitable for table conversion based, at least in part, on the delimiter count.

8. The apparatus of claim 1, the actions further including:
analyzing a digital document to determine whether the digital document includes a set of text that is a text-to-table conversion candidate; and
upon determining that the digital document includes a set of text that is a text-to-table conversion candidate, providing the set of text as the input text.

9. The apparatus of claim 8, wherein analyzing the digital document to determine whether the digital document includes a set of text that is a text-to-table conversion candidate includes at least one of: determining whether the digital document includes any bulleted lists, determining whether the digital document includes any numbered lists, or determining whether the digital document contains any new-line-delimited sets of text.

10. The apparatus of claim 8, wherein analyzing the digital document to determine whether the digital document includes a set of text that is text-to-table conversion candidate is performed at periodic time intervals.

11. The apparatus of claim 1, wherein the delimiter count includes, for each row of the input text, a count as to how many delimiters of each delimiter in a defined set of delimiters is in that row.

12. The apparatus of claim 11, wherein the plurality of characteristics further includes at least one of: a characteristic that is associated with a character count of each row in the rows of input text, a characteristic that is associated with a word count of each row in the rows of input text, or a characteristic that is associated with a presence of connectors words in the rows of the input text.

13. The apparatus of claim 11, wherein making the determination as to whether the input text is suitable for table conversion includes:
performing a filtering of delimiters in the input text based on delimiter frequency; and
after performing the filtering of the delimiters, if at least one delimiter remains, determining that the input text is suitable for table conversion.

14. The apparatus of claim 13, wherein performing the filtering of delimiters in the input text based on delimiter frequency includes, for each delimiter in the set of pre-defined delimiters, removing that delimiter if a number of rows that include that delimiter is less than a delimiter frequency threshold.

15. The apparatus of claim 13, wherein the actions further include:
after performing the filtering of the delimiters, if at least one delimiter remains, determining at least one delimiter among the remaining delimiters to use as a delimiter when converting the input text into a table, wherein determining the at least one delimiter includes:
for each row of the input text, for each remaining delimiter, evaluating a delimiter count difference between a maximum count of the delimiter and a minimum count of the delimiter, and eliminating delimiters having a difference greater than a minimum delimiter count difference among the delimiter count differences.

16. The apparatus of claim 13, wherein making the determination as to whether the input text is suitable for table conversion includes:
after performing the filtering of the delimiters, if no delimiters remain:
determining whether space or a connector word is a suitable delimiter;
if it determined that space or at least one connector word is a suitable delimiter determining that the input text is suitable for conversion to a table; else
determining that the input text is not suitable for conversion to a table.

17. A method, comprising:
receiving input text;

determining whether the input text includes at least three rows;

based on determining that the input text includes at least three rows, ascertaining a plurality of characteristics of the input text, wherein each characteristic of the plurality of characteristics is associated with a consistency between the rows of the input text, and wherein the plurality of characteristics includes at least one characteristic that is associated with delimiter usage in the input text;

via at least one processor, making a rules-based decision as to whether the input text is suitable for table conversion based on the plurality of characteristics; and responsive to making a positive rules-based decision that the input text is suitable for table conversion, enabling conversion of the input text to a table using a machine-learning model.

18. The method of claim 17, wherein the delimiter usage includes, for each row of the input text, a count as to how many delimiters of each delimiter in a defined set of delimiters is in that row, and wherein the plurality of characteristics further includes lengths of the rows of the input text.

19. A processor-readable storage medium, having stored thereon processor-executable code that, upon execution by at least one processor, enables actions, comprising:

receiving input text;

determining whether the input text includes at least three rows;

based on determining that the input text includes at least three rows, evaluating a plurality of characteristics of the input text, and wherein the plurality of characteristics includes a delimiter usage and further includes at least one parameter associated with row lengths;

performing a prediction as to whether the input text is suitable for table conversion based on the plurality of characteristics; and providing at least one result that is associated with the prediction, including at least an indication as to whether the input text is suitable for table conversion based on the prediction.

20. The processor-readable storage medium of claim 19, wherein the delimiter usage includes, for each row of the input text, a count as to how many delimiters of each delimiter in a defined set of delimiters is in that row.

* * * * *